United States Patent
Hu et al.

(10) Patent No.: US 10,803,120 B1
(45) Date of Patent: Oct. 13, 2020

(54) GEOLOCATION BASED PLAYLISTS

(71) Applicant: Snap Inc., Santa Monica, CA (US)

(72) Inventors: Yu Hu, Marina del Rey, CA (US); Caleb Ogden, Playa Vista, CA (US); Kirk Ouimet, Orem, UT (US); Ike Z. Adler, Malibu, CA (US)

(73) Assignee: Snap Inc., Santa Monica, CA (US)

( * ) Notice: Subject to any disclaimer, the term of this patent is extended or adjusted under 35 U.S.C. 154(b) by 347 days.

(21) Appl. No.: 15/610,290

(22) Filed: May 31, 2017

(51) Int. Cl.
  *G06F 16/00* (2019.01)
  *G06F 16/68* (2019.01)
  *G06F 16/638* (2019.01)
  *G06F 16/9537* (2019.01)
  *H04L 29/08* (2006.01)

(52) U.S. Cl.
  CPC .......... *G06F 16/686* (2019.01); *G06F 16/639* (2019.01); *G06F 16/9537* (2019.01); *H04L 67/18* (2013.01)

(58) Field of Classification Search
  CPC .. G06F 16/686; G06F 16/639; G06F 16/9537; H04L 67/18
  See application file for complete search history.

(56) References Cited

U.S. PATENT DOCUMENTS

| | | | | |
|---|---|---|---|---|
| 8,639,706 B1 * | 1/2014 | Bilinski | .................. | H04L 51/10 707/752 |
| 10,140,515 B1 * | 11/2018 | Waldo | ................ | G06K 9/00684 |
| 10,387,478 B2 * | 8/2019 | Cao | ..................... | G06Q 30/0631 |
| 2009/0222864 A1 * | 9/2009 | Drakoulis | .......... | G06Q 30/0603 725/87 |
| 2010/0070917 A1 * | 3/2010 | Gates | ................... | G11B 27/105 715/810 |
| 2011/0118859 A1 * | 5/2011 | Theimer | ................... | H04S 7/30 700/94 |
| 2012/0072418 A1 * | 3/2012 | Svendsen | ................ | H04L 67/42 707/724 |
| 2012/0215643 A1 * | 8/2012 | Nuzzi | ..................... | G06Q 30/02 705/14.66 |
| 2012/0221687 A1 * | 8/2012 | Hunter | .................. | G06F 16/435 709/219 |
| 2013/0110848 A1 * | 5/2013 | Svendsen | .............. | G06F 16/435 707/748 |
| 2013/0235027 A1 * | 9/2013 | Sharifi | ............... | G06Q 10/0637 345/418 |
| 2014/0122590 A1 * | 5/2014 | Svendsen | ............. | H04N 21/252 709/204 |

(Continued)

*Primary Examiner* — Tarek Chbouki

(74) *Attorney, Agent, or Firm* — Schwegman Lundberg & Woessner, P.A.

(57) ABSTRACT

A messaging server system receives audio data packages from a plurality of client devices. Each audio data package includes audio content captured by a respective client device from the plurality of client devices, and location data describing a location of the respective client device when the audio content was captured. The messaging server system identifies, based on the location data included in the audio data packages, a subset of the audio data packages that include audio content captured within a predetermined geographic area. The messaging server system generates, based on the subset of the audio data packages, a playlist of audio content items for the predetermined geographic area, and provides the playlist of audio content items to at least a first client device.

20 Claims, 11 Drawing Sheets

(56) References Cited

U.S. PATENT DOCUMENTS

| | | | |
|---|---|---|---|
| 2015/0032744 A1* | 1/2015 | Roulliere | G11B 27/034 707/736 |
| 2016/0050446 A1* | 2/2016 | Fujioka | G06F 16/9535 725/93 |
| 2016/0246792 A1* | 8/2016 | Anguiano | G06F 16/9537 |

* cited by examiner

900

```
┌─────────────────────────────────────────────────────────────┐
│  DETERMINE A NUMBER OF OCCURRENCES OF EACH AUDIO CONTENT    │
│           ITEM IN A SET OF AUDIO CONTENT ITEM               │
│                            902                              │
└─────────────────────────────────────────────────────────────┘
                              │
                              ▼
┌─────────────────────────────────────────────────────────────┐
│  DETERMINE WHETHER THE NUMBER OF OCCURRENCES OF EACH AUDIO  │
│   CONTENT ITEM MEETS OR EXCEEDS A THRESHOLD NUMBER OF       │
│                        OCCURENCES                           │
│                            904                              │
└─────────────────────────────────────────────────────────────┘
                              │
                              ▼
┌─────────────────────────────────────────────────────────────┐
│  INCLUDE EACH AUDIO CONTENT ITEM ASSOCIATED WITH A NUMBER OF│
│  OCCURRENCES THAT MEETS OR EXCEEDS THE THRESHOLD NUMBER OF  │
│             OCCURRENCES TO THE PLAYLIST                     │
│                            906                              │
└─────────────────────────────────────────────────────────────┘
```

FIG. 9

GEOLOCATION BASED PLAYLISTS

BACKGROUND

Mobile applications allow users to capture and share images. For example, social networking services allow users to capture and post images that are accessible by the user's connections on the social networking service. This allows users to share experiences, such as a wedding, concert, etc., with users that are not attending event. While sharing images and/or videos provides users with insight into an event, the shared experience is limited. Accordingly, improvements are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 is a flowchart illustrating a method for selecting audio content items based on the number of occurrences, according to certain example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments described herein relate to systems and methods for generating geolocation based playlists based on audio data packages received from client devices. An audio content identification system determines an audio content item based on audio content captured by a client device. An audio content item is any type of content including audio, such as song, album, audio book, etc. A client device captures audio data utilizing a microphone of the client device. For example, the client device captures a portion song or other audio playing in the physical environment of the client device. The client device includes the captured audio data in a data package that is then transmitted to the audio content identification system. The audio content identification system utilizes the received audio data to identify the corresponding audio content item (e.g., song), and returns data identifying the audio content item to the client device.

A collection management system utilizes the audio data packages to generate geolocation based playlists. A geolocation based playlist is a collection of audio content items that were recorded by client devices while within a predetermined geographic location. Examples of geolocation based playlist include a playlist of songs recorded at a concert venue, college campus, city festival, etc. The collection management system provides the generated geolocation based playlist to other users, thereby enabling the users to experience the audio content items (e.g., songs) that are playing at the predetermined geographic location.

Each audio data package further includes location data describing a geographic location where the audio content in the audio data package was captured. The collection management system utilizes the location data to identify a subset of the audio data packages that include audio content captured within a predetermined geographic area. The collection management system then generates a playlist of audio content for the predetermined geographic area based on the subset of audio data packages. For example, the collection management system includes the most frequently occurring content items in the playlist.

DRAWINGS

Figure 1:
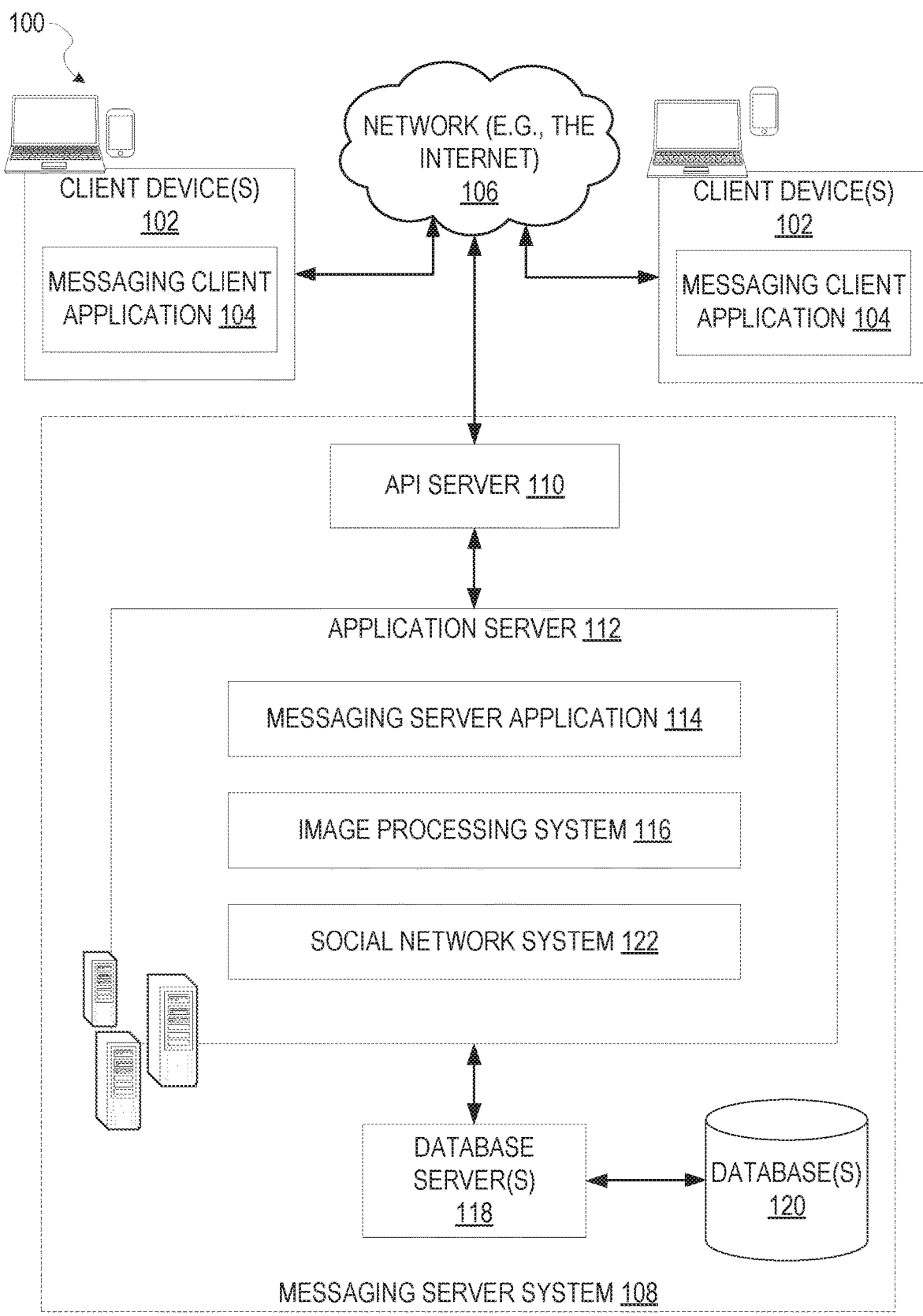
FIG. 1 is a block diagram showing an example messaging system for exchanging data (e.g., messages and associated content) over a network in accordance with some embodiments.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes protocol requests (e.g., API calls/commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., protocol requests and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data, the retrieval of a list of connections (e.g., friends, follower, etc.) of a user of a client device 102, the retrieval of such collections, the retrieval of messages and content, the adding and deletion of connections to the entity graph, the location of connections within the entity graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph 304 within the database 120. Examples of functions and services supported by the social network system 122 include the identification of connections between users registered with the messaging system 100. A user or entity registers with the messaging system 100 by creating an account with the messaging system 100. Once a user or entity has registered with the messaging system 100, the user or entity is added to the entity graph and may begin establishing connections with other user and/or entities that are registered with the messaging system 100.

A connection between users indicates a relationship between the users. An example relationship is one user "following" the other user to view content and/or messages posted by the user. Another example relationship is two users become "friends," thereby allowing the users to view content and/or messages posted by the other user. Another example function and service supported by the social network system 122 is the identification of other entities and interests of a particular user.

The application server 112 is communicatively coupled to a database server 118, which facilitates access to a database 120 in which is stored data associated with messages processed by the messaging server application 114.

Figure 2:
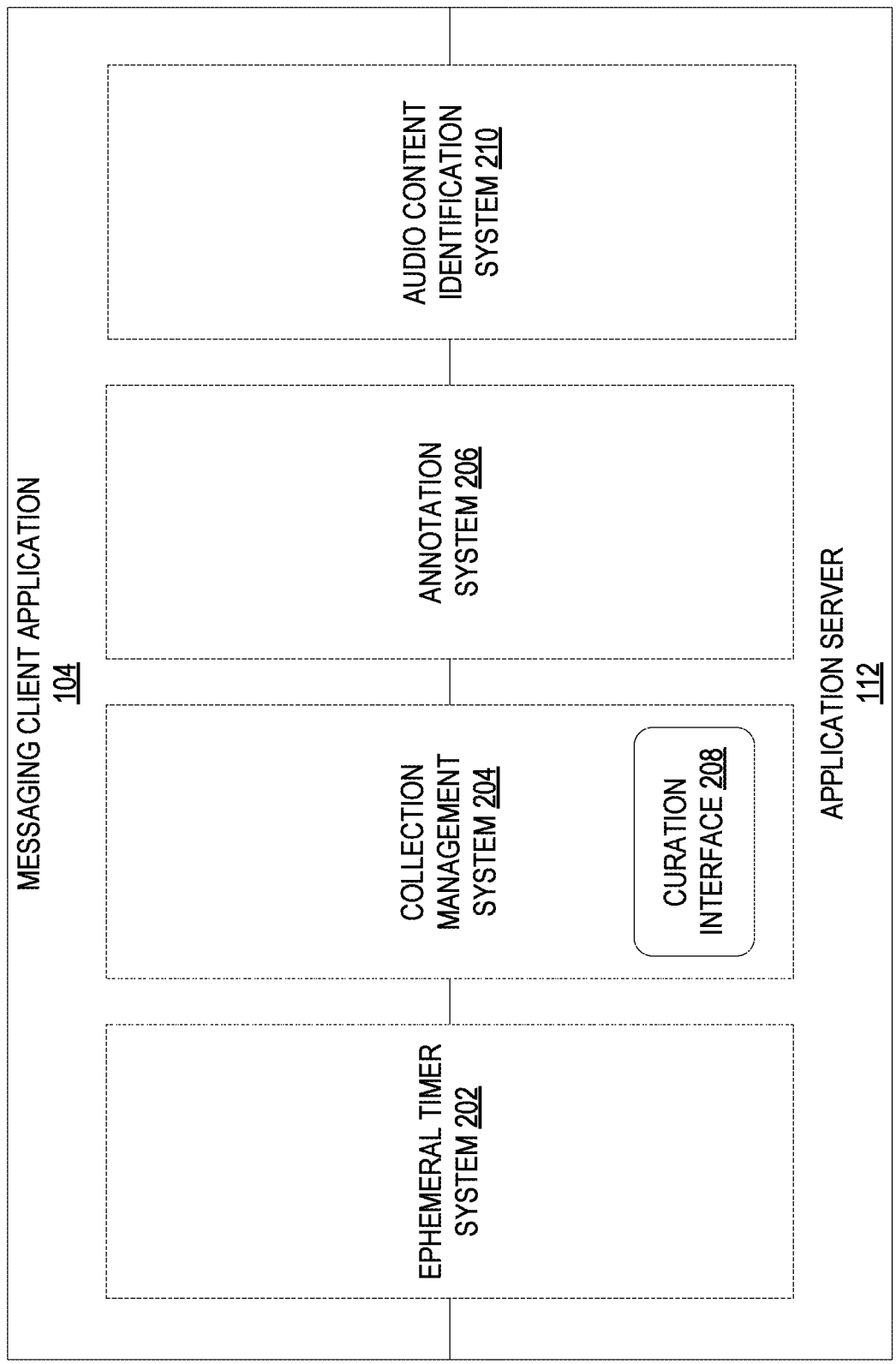
FIG. 2 is block diagram illustrating further details regarding a messaging system, according to example embodiments.

FIG. 2 is block diagram illustrating further details regarding the messaging system 100. Specifically, the messaging system 100 is shown to comprise the messaging client application 104 and the application server 112, which in turn embody a number of some subsystems, namely an ephemeral timer system 202, a collection management system 204, an annotation system 206, and an audio content identification system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery," "event story," or "event group story." Such a collection may be made available for a specified time period (i.e., event window), such as the duration of a specified event to which the content relates. For example, content relating to a specified event such as a music concert may be made available as a "Story" for the duration of that music concert. The collection management system 204 may also be responsible for publishing a user interface element (e.g., icon, button, etc.) that provides notification of the existence of a particular collection to the user interface of the messaging client application 104.

A collection may also constitute a "Group Story," which is a collection of content from multiple authorized users that is created manually, automatically or using a combination of manual and automatic techniques. For example, a "Group Story" may constitute a curated stream of user-submitted content from varies locations and events. Users, whose client devices have location services enabled and are at a common location event at a particular time may, for example, be presented with an option, via a user interface of the messaging client application 104, to contribute content to a particular group story. The group story may be identified to the user by the messaging client application 104, based on his or her location as well as the user meeting other specified group eligibility criteria. The end result is a "Group Story" told from a community perspective.

Group stories associated with an event and/or a specific geographic location (e.g., at a wedding,) may include a condition that an authorized user be within a specified distance of the event (e.g., geographic location of the event) to contribute to and/or view content included in the group story. In some embodiments, a user's ability to contribute and/or view a group story may be dependent on that user being connected to a user that initiated the group story. For instance, a user may be required to be within a threshold degree of connection (e.g., friend of a friend).

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The collection management system 204 also generates geolocation based playlists that are collections of audio content items (e.g., songs, audiobooks, etc.) ordered for playback by a user. An example of a playlist includes a playlist of songs ordered to be played in sequential order such that when playback of one song is completed, playback of the next sequentially ordered song begins. A geolocation based playlist includes audio content items that were captured by client device 102 while located within a predetermined geographic region. For example, a geolocation playlist may include songs captured at a music festival, street fair, sporting event, wedding, etc.

The collection management system 204 works with the audio content identification system 210 to identify audio content items that were captured within a predetermined geographic area. The functionality of the audio content identification system 210 is described in greater detail below. The collection management system 204 generates a geolocation based playlist from the identified audio content items that were captured within the predetermined geographic area. For example, the collection management system 204 identifies the audio content items that were most commonly captured within the geographic area and includes the identified content items in the geolocation based playlist. Once generated, the collection management system 204 provides the geolocation based playlist to users. For example, the collection management system 204 causes a user interface element, such as a selectable icon, to be presented on client devices 102, which a user can select to access the geolocation based playlist.

As another example, the collection management system 205 incorporates a geolocation playlist into a corresponding story. For example, a location and/or event based story may be created for the same geographic location and/or event as a geolocation based playlist. For example, both a story and geolocation based playlist can be created for a concert, festival, etc. In this type of embodiment, the collection management system 205 incorporates the geolocation playlist into the corresponding story. Accordingly, a user that accesses the story is presented with the geolocation based playlist and can access the audio content items that were captured at the event and/or location as well as view images, videos, etc., that were captured at the event and/or location.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time The audio content identification system 210 identifies content items based on audio content captured by a client device 102. For example, a user that is curious what song is playing can utilize their client device's 102 microphone to capture a portion of the song. The client device 102 provides this captured audio content to the audio content identification system 210 in an audio data package. The audio data package includes additional metadata, such as location data describing the location of the client device 102. The audio content identification system 210 identifies the audio content item (e.g., song) based on the audio content included in the audio content data package. The audio content identification system 210 then provides the client device 102 with data identifying the audio content item, such as the name of the song, artist, album, etc.

The audio content identification system 210 identifies audio content items using any known technique in the art. For example, the audio content identification system 210 can utilize acoustic fingerprint techniques, such as those used by SHAZAM, SOUNDCLOUD, etc., to identify audio content items. In this type of embodiment, the audio content identification system 210 generates an acoustic fingerprint from the audio content received in an audio data package. The audio content identification system 210 then searches a database of acoustic fingerprints to identify the corresponding audio content item. The database of acoustic fingerprints includes metadata describing each audio content item, such as a title, artist, album, etc. The audio content identification system 210 utilizes the stored metadata to provide the client device 102 with data identifying the audio content data item.

Figure 3:
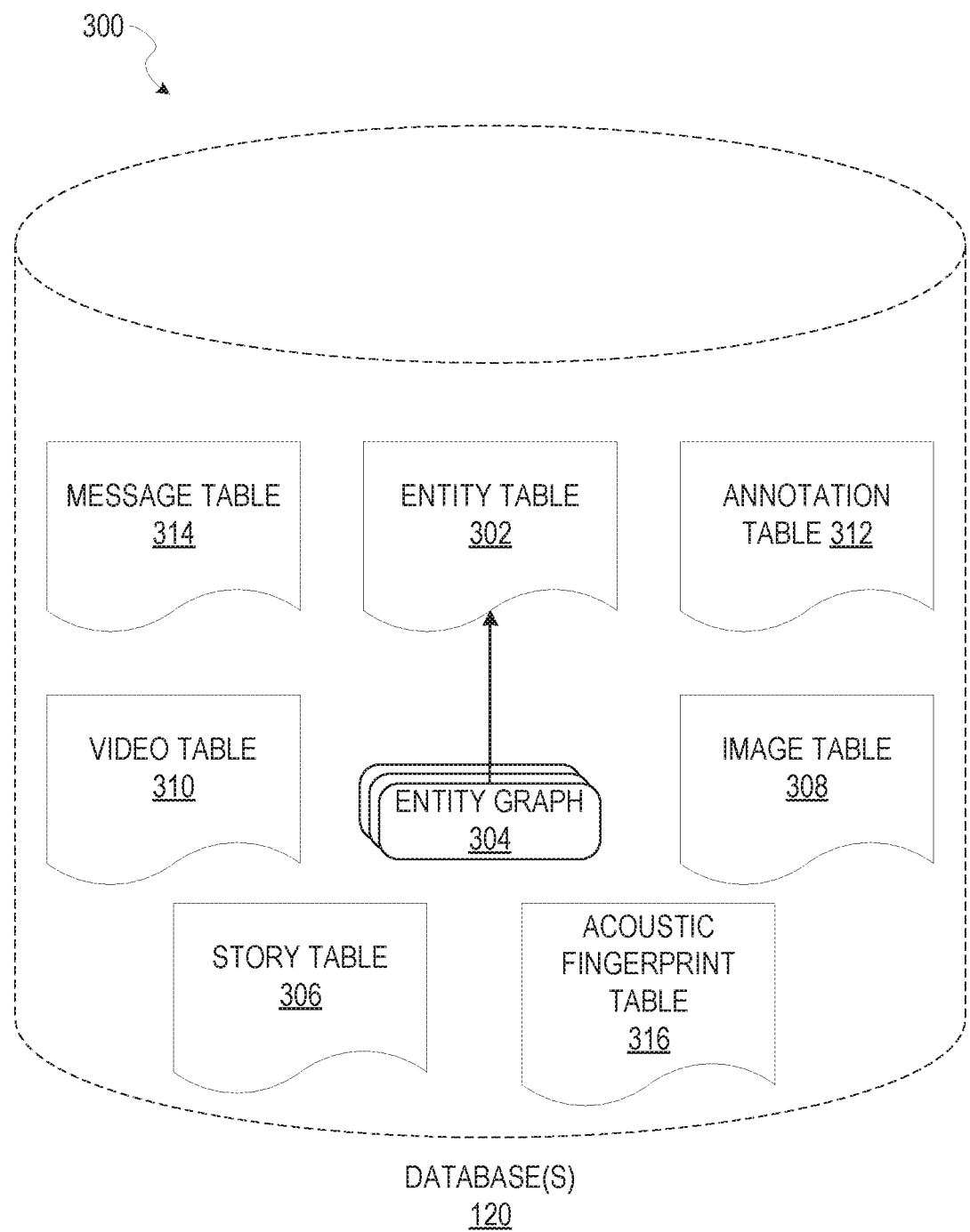
FIG. 3 is a schematic diagram illustrating data which may be stored in the database of the messaging server system, according to certain example embodiments.

FIG. 3 is a schematic diagram 300 illustrating data 300 which may be stored in the database 120 of the messaging server system 108. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include registered users, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding connections between the entities. A connection between entities indicates a relationship between the user accounts of entities with relation to the messaging system. An example relationship is one entity "following" the other entity to view content and/or messages posted by the entity. Another example relationship is two entities becoming "friends," thereby allowing the entities to view content and/or messages posted by the other entity. The entity graph 304 also includes other relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as Geofilters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT Story or a gallery). The creation of a particular collection may be initiated by a particular user (e.g., each user for which a record is maintained in the entity table 302). A user may create a "Group Story" in the form of a collection of content that has been created and sent/broadcast by that user and other authorized users. To this end, the user interface of the messaging client application 104 may include an icon that is user selectable to enable a sending user to add specific content to a group story to which the user is authorized to post.

The story table 306 includes data associated with a created group story, such as images, messages, video data, audio data, etc. that are included in the group story, a title designated to the group story, a unique identifier for the group story, story parameters, etc. Examples of group parameter data included in the story table 306 includes a user that initiated the group story, users authorized to post and/or view content, an event associated with the group story, geographic locations associated with the group story, etc.

The database 120 also includes an acoustic fingerprint table 316. The acoustic fingerprint table 316 includes a listing of acoustic fingerprints corresponding to audio content items. The acoustic fingerprint table 316 also includes metadata corresponding to the acoustic fingerprints, such as a song title, artist, album, lyrics, album image, etc.

Figure 4:
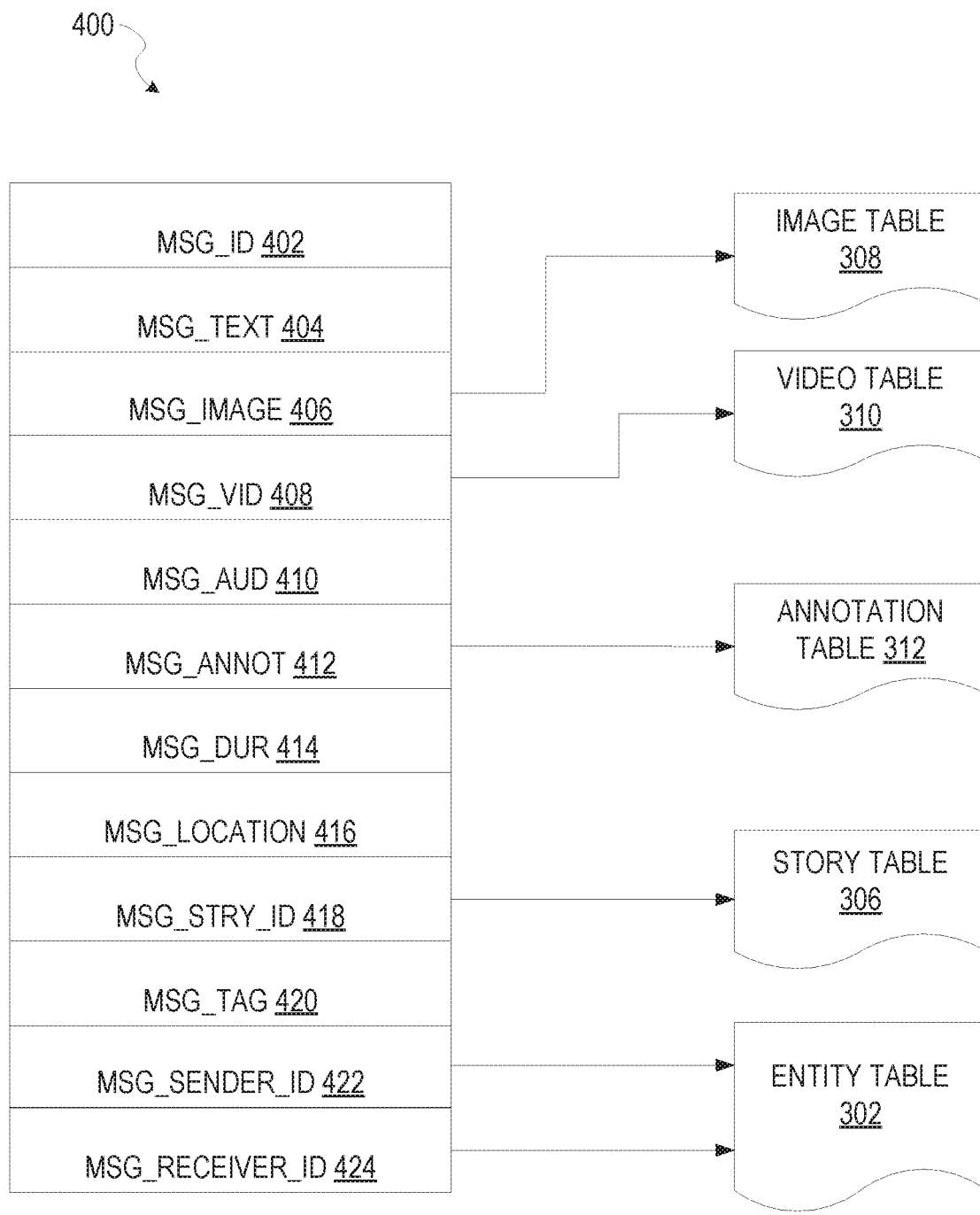
FIG. 4 is a schematic diagram illustrating a structure of a message, according to some embodiments.

FIG. 4 is a schematic diagram illustrating a structure of a message. The message is generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., stories, group stories, etc.) with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address or device identifier) indicative of a user of the client device 102 on which the message 400 was generated and from which the message 400 was sent
- A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
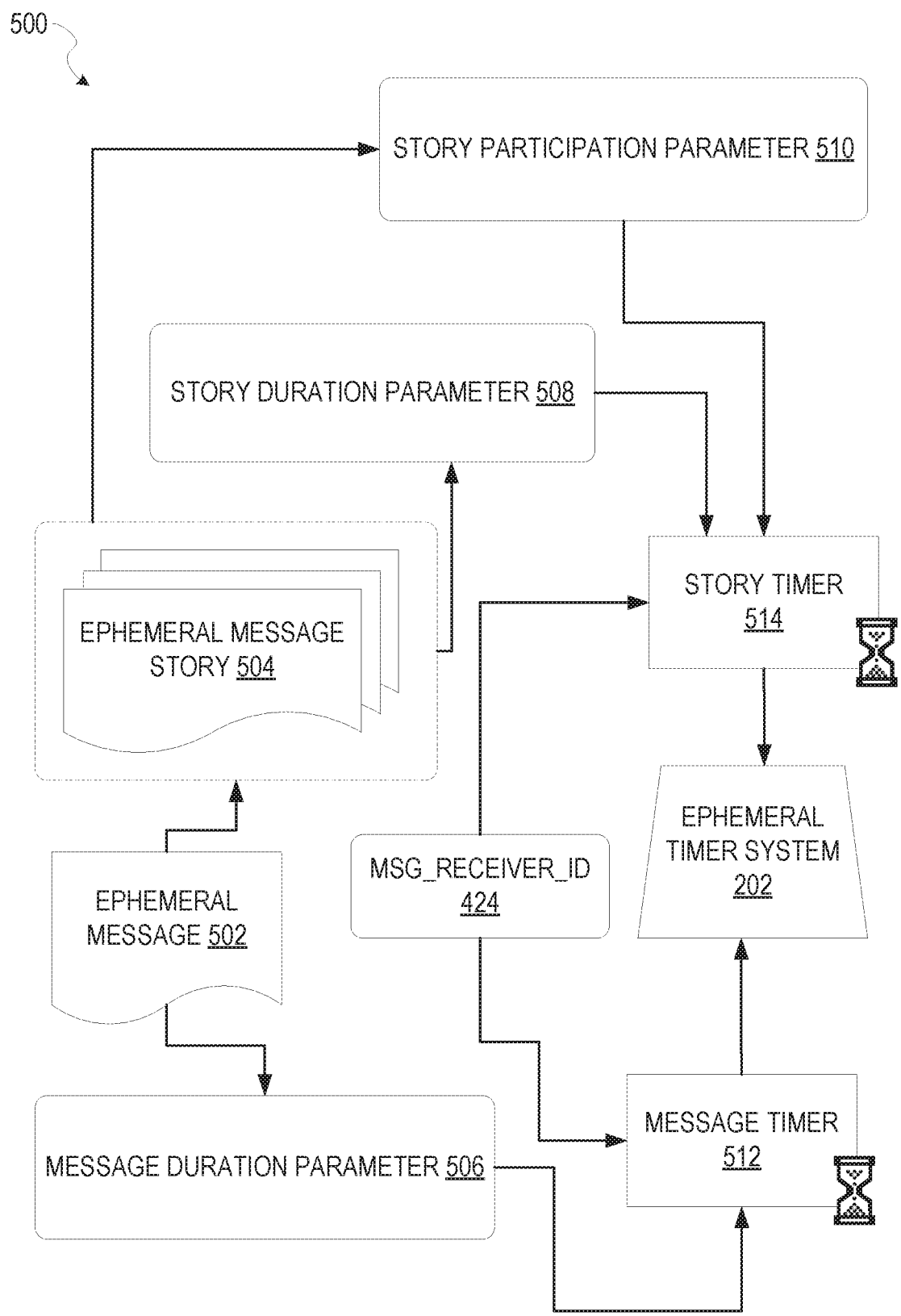
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, an event story, group story, etc.). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
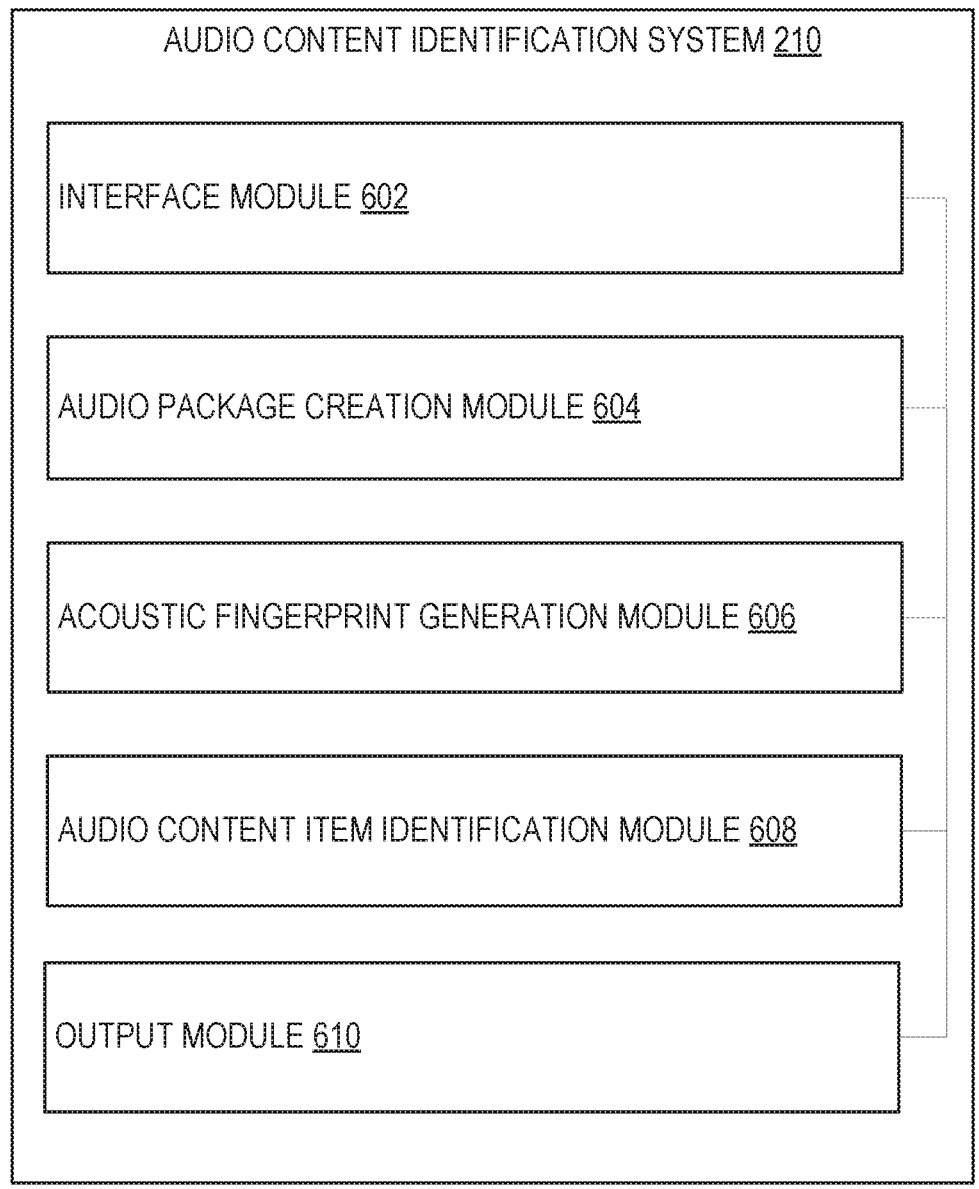
FIG. 6 is a block diagram illustrating various modules of the audio content identification system, according to certain example embodiments.

FIG. 6 is a block diagram illustrating various modules of the audio content identification system 210, according to certain example embodiments. The audio content identification system 210 is shown as including an interface module 602, an audio package creation module 604, an acoustic fingerprint generation module 606, an audio content item identification module 608, and an output module 610. The various modules of the audio content identification system 210 are configured to communicate with each other (e.g., via a bus, shared memory, or a switch). Any one or more of these modules may be implemented using one or more computer processors (e.g., by configuring such one or more computer processors to perform functions described for that module) and hence may include one or more of the computer processors.

Any one or more of the modules described may be implemented using hardware alone (e.g., one or more of the computer processors of a machine) or a combination of hardware and software. For example, any described module of the audio content identification system 210 may physically include an arrangement of one or more of the computer processors (e.g., a subset of or among the one or more computer processors of the machine) configured to perform the operations described herein for that module. As another example, any module of the audio content identification system 210 may include software, hardware, or both, that configure an arrangement of one or more computer processors (e.g., among the one or more computer processors of the machine) to perform the operations described herein for that module. Accordingly, different modules of the audio content identification system 210 may include and configure different arrangements of such computer processors or a single arrangement of such computer processors at different points in time. Moreover, any two or more modules of the audio content identification system 210 may be combined into a single module, and the functions described herein for a single module may be subdivided among multiple modules. Furthermore, according to various example embodiments, modules described herein as being implemented within a single machine, database, or device may be distributed across multiple machines, databases, or devices.

To avoid obscuring the inventive subject matter with unnecessary detail, various functional components (e.g., modules) that are not germane to conveying an understanding of the inventive subject matter have been omitted from FIG. 6. However, it will be appreciated that various additional functional components may be supported by the audio content identification system 210 to facilitate additional functionality that is not specifically described herein. Furthermore, the various functional modules depicted in FIG. 6 may reside on a single computing device or may be distributed across several computing devices in various arrangements such as those used in cloud-based architectures.

The interface module 602 provides a user interface on a user's client device 102 that enables the user to identify a content item playing in the user's environment. For example, the user interface includes one or more graphical user interface elements, such as buttons, that a user may select to cause the client device 102 to capture audio content using a microphone of the client device 102. The user interface further presents the user with information identifying an audio content item, such as a title, artist, lyrics, album, etc.

The audio data package creation module 604 generates an audio data package. An audio data package includes audio content captured by a microphone of a client device 102. The audio data package further includes other metadata, such as location data describing the geographic location of the client device 102 when the audio content was captured. The audio data package creation module 604 determines the location of the client device 102 utilizing any known technique. For example, the audio data package creation module 604 gathers the location data from an internal sensor of the client device 102, such as a Global Positioning System (GPS) component. The audio data package may include data in addition to location data, such as a device identifier for the client device 102, account identifier associated with a user of the client device 102, time stamp indicating a time at which the audio content was captured by the client device 102, etc.

The audio data package creation module 604 generates the audio data package at the client device 102 and provides the audio data package to the application server 112.

The acoustic fingerprint generation module 606 generates an acoustic fingerprint from the acoustic content included in a received audio data package. The acoustic fingerprint generation module 606 may utilize any know technique to generate the acoustic fingerprint. For example, the acoustic fingerprint generation module 606 may use techniques used by services such as SHAZAM, SOUNDCLOUD, etc.

The audio content item identification module 608 identifies an audio content item corresponding to the acoustic fingerprint generated by the acoustic fingerprint generation module 606. The audio content item identification module 608 uses the generated acoustic fingerprint to search the acoustic fingerprint table 316 for a matching acoustic fingerprint. If a match is found, the audio content item identification module 608 access the metadata associated with the matching acoustic fingerprint in the acoustic fingerprint table 316. The metadata includes data identifying the corresponding audio content item, such as the title, artist, album, lyrics, etc.

The output module 610 provides data identifying the audio content item to the client device 102. For example, the output module 610 provides the client device 102 with the title, artist, album, etc. Alternatively, if the audio content item could not be identified, the output module 610 provides the client device 102 with a message indicating that the content item could not be identified.

Figure 7:
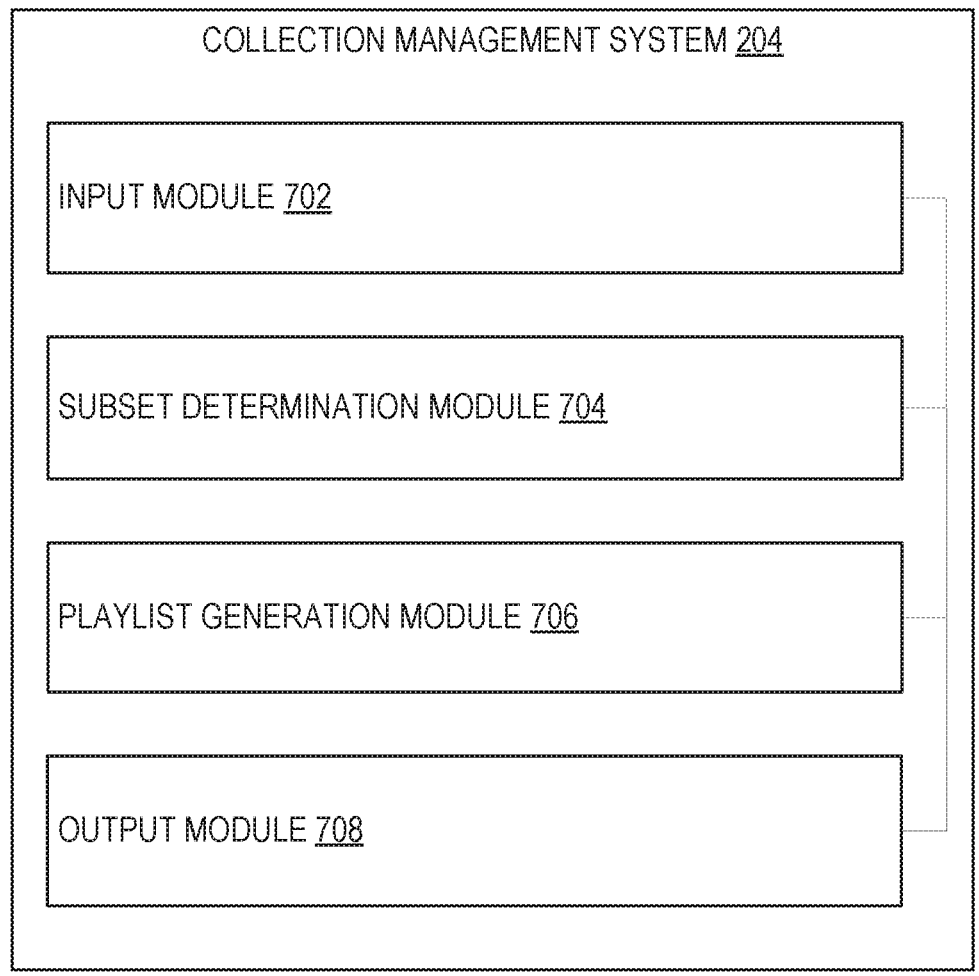
FIG. 7 is a block diagram illustrating various modules of the collection management system, according to certain example embodiments.

FIG. 7 is a block diagram illustrating various modules of the collection management system 204, according to certain example embodiments. The collection management system 204 is shown as including a input module 702, a subset determination module 704, a playlist generation module 706 and an output module 708. The various modules of the collection management system 204 are configured to communicate with each other (e.g., via a bus, shared memory, or a switch). Any one or more of these modules may be implemented using one or more computer processors (e.g., by configuring such one or more computer processors to perform functions described for that module) and hence may include one or more of the computer processors.

Any one or more of the modules described may be implemented using hardware alone (e.g., one or more of the computer processors of a machine) or a combination of hardware and software. For example, any described module of the collection management system 204 may physically include an arrangement of one or more of the computer processors (e.g., a subset of or among the one or more computer processors of the machine) configured to perform the operations described herein for that module. As another example, any module of the collection management system 204 may include software, hardware, or both, that configure an arrangement of one or more computer processors (e.g., among the one or more computer processors of the machine) to perform the operations described herein for that module. Accordingly, different modules of the collection management system 204 may include and configure different arrangements of such computer processors or a single arrangement of such computer processors at different points in time. Moreover, any two or more modules of the collection management system 204 may be combined into a single module, and the functions described herein for a single module may be subdivided among multiple modules. Furthermore, according to various example embodiments, modules described herein as being implemented within a single machine, database, or device may be distributed across multiple machines, databases, or devices.

To avoid obscuring the inventive subject matter with unnecessary detail, various functional components (e.g., modules) that are not germane to conveying an understanding of the inventive subject matter have been omitted from FIG. 7. However, it will be appreciated that various additional functional components may be supported by the collection management system 204 to facilitate additional functionality that is not specifically described herein. Furthermore, the various functional modules depicted in FIG. 7 may reside on a single computing device or may be distributed across several computing devices in various arrangements such as those used in cloud-based architectures The input module 702 receives data identifying the audio content items captured by client devices 102. In one embodiment, the input module 702 receives audio data packages from client devices 102. In this type of embodiment, the input module 702 shares the audio data packages with the audio content identification system 210 to identify the captured audio content items. The audio content identification system 210 returns data identifying the captured audio content items to the input module 702.

Alternatively, in another embodiment, the audio content identification system 210 receives the audio data packages from the client device 102, and then provides data identifying the captured content items to the input module 702. For example, the audio content identification system 210 provides the data periodically or in response to requests from the input module 702.

The data identifying the audio content items includes data identifying the captured audio content item, such as the artist, title, album, etc. The data identifying the audio content items also includes contextual data, such as a time the audio content item was captured, a geographic location where the audio content item was captured, the client device 102 that captured the audio content item, etc.

The subset determination module 704 determines subsets of the audio content items based on the contextual data received from the audio content identification system 210 and one or more factors. Examples of factors include, geographic location, time, users, user connections, user age, etc. Accordingly, in one embodiments, the subset determination module 704 identifies a subset of content items that were captured within a specified geographic area and within a specified time period. As another example, the subset determination module 704 determines a subset of content items captured within a specific geographic area by users within a threshold connectivity level in the entity graph (e.g., friends, friends of friends, etc.).

In some embodiments, the factors may be provided by an administrator or other authorized user. For example, an administrator may provide factors coinciding to a specified event, such as the providing the geographic location and times of a concert, street festival, etc. The subset determination module 704 uses the provided factors to identify the audio content items that were captured at the specified event.

As another example, the subset determination module 704 may identify the subsets based on identifying a threshold number of audio content items captured within a threshold distance and/or threshold time of each other. For example, the subset determination module 704 continuously analyzes the contextual data associated with the captured content items and identifies a subset of audio content items when at least a threshold number of content items were captured within a threshold distance and/or threshold time of each other. In this type of embodiment, the subset determination module 704 is not specifically looking for content items captured during an event, but rather is identifying potential events based on a threshold number of audio content items being captured within a predetermined threshold distance and/or time of each other.

The playlist generation module 706 generates geolocation based playlists based on the subsets of content items identified by the subset determination module 704. For example, the playlist generation module 706 determines, based on a subset of content items, a number of occurrences of each audio content item within the subset of content items. An occurrence of an audio content item is counted for each time the audio content item was captured. For example, the same audio content item can be captured by multiple users within the same geographic area. Accordingly, the number of occurrences of an audio content item indicates the number of times the content item was captured by client device 102 at the geographic location.

The playlist generation module 706 uses the determined number of occurrences for each audio content item to generate a geolocation based playlist. For example, the playlist generation module 706 includes the audio content items that occurred the most often into the playlist, such ten songs that occurred most often. As another example, the playlist generation module 706 includes the audio content items that occurred at least a threshold number of times in the geolocation based playlist. For example, the playlist generation module 706 can include each audio content item that occurred at least five times into the geolocation based playlist.

The output module 708 provides access to geolocation based playlists that have been generated by the playlist generation module 706. For example, the output module 708 causes client devices 102 to present user interface elements, such as icons, that users of the client devices 102 can select to access a corresponding geolocation based playlists. Once a user has selected to access a geolocation based playlist, the audio content items included in the geolocation based playlist are presented to the user. For example, songs included in the playlist are streamed to the user's client device 102, where they are played for the user.

As another example, the output module 708 incorporates a geolocation playlist into a corresponding story. For example, a location and/or event based story may be created for the same geographic location and/or event as a geolocation based playlist. For example, both a story and geolocation based playlist can be created for a concert, festival, etc. In this type of embodiment, the output module 708 incorporates the geolocation playlist into the corresponding story. Accordingly, a user that accesses the story is presented with the geolocation based playlist and can access the audio content items that were captured at the event and/or location as well as view images, videos, etc., that were captured at the event and/or location.

Figure 8:
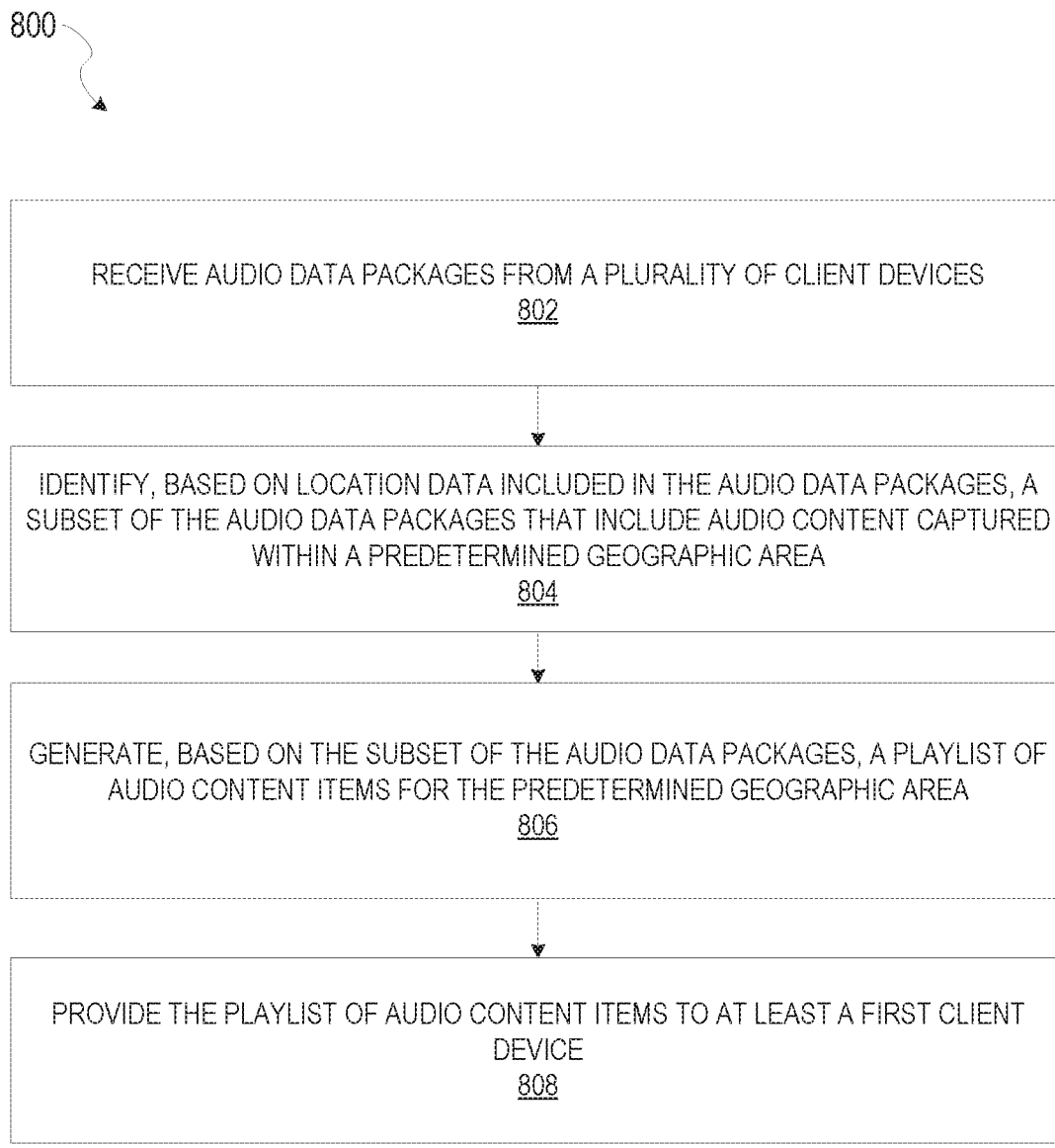
FIG. 8 is a flowchart illustrating a method for generating a geolocation based playlist, according to certain example embodiments.

FIG. 8 is a flowchart illustrating a method 800 for generating a geolocation based playlist, according to certain example embodiments. The method 800 may be embodied in computer-readable instructions for execution by one or more computer processors such that the operations of the method 800 may be performed in part or in whole by the collection management system 204; accordingly, the method 800 is described below by way of example with reference thereto. However, it shall be appreciated that at least some of the operations of the method 800 may be deployed on various other hardware configurations and the method 800 is not intended to be limited to the collection management system 204.

At operation 802, the input module 702 receives audio data packages from a plurality of client devices 102. Each audio data package includes audio content captured by the respective client device 102 from which the audio data package was received. Each audio data package also included location data describing the location of the respective client device 102 when the audio data package was captured. The client device 102 captures audio content to utilize an audio content identification system 210 that identifies an audio content item based on a recording of a portion of the audio content item. For example, a user that is curious about the name of a song that is playing in the user's environment can utilize the microphone on their client device 102 to capture a portion of the song, which the audio content identification system 210 uses to identify the song. The audio content identification system 210 identifies the song based on the captured audio data and returns data identifying the song, such as the title, artist, album, etc.

At operation 804, the subset determination module 704 identifies, based on location data included in the audio data packages, a subset of the audio data packages that include audio content captured within a predetermined geographic area. The predetermined geographic area may correspond to any type of geographic location, landmark, etc., such as a college campus, city, state, etc. Further, the predetermined geographic area may also correspond to a specified event, such as a concert, festival, graduation, etc. In this type of embodiment, the subset determination module 704 identifies a subset of the audio data packages based on a time at which the audio content was captured in addition to the geographic location at which it was captured. In other embodiments, the subset determination module 704 identifies the subset of the audio data packages based on other factors as well, such as connectivity between users in the entity graph, age of users, etc.

At operation 806, the playlist generation module 706 generates, based on the subset of the audio data packages, a playlist of audio content items for the predetermined geographic area. For example, the playlist generation module 706 determines a number of occurrences for each audio content item and then generates the playlist based on the determined number of occurrences. An occurrence of an audio content item indicates each instance in which a user recorded a portion of the audio content item using their client device 102, for use with the audio content identification system 210. The playlist generation module 706 selects audio content items to include in the playlist as well as a corresponding order in which the audio content items are to be performed.

At operation 808, the output module 708 provides the playlist of audio content items to at least a first client device.

Providing the playlist includes providing a selectable user interface element, such as an icon, that a user can select to access the playlist. Accessing the playlist includes streaming the playlist to a client device 102, where the audio content item is performed for the user.

FIG. 9 is a flowchart illustrating a method 900 for selecting audio content items based on the number of occurrences, according to certain example embodiments. The method 900 may be embodied in computer-readable instructions for execution by one or more computer processors such that the operations of the method 900 may be performed in part or in whole by the collection management system 204; accordingly, the method 900 is described below by way of example with reference thereto. However, it shall be appreciated that at least some of the operations of the method 900 may be deployed on various other hardware configurations and the method 900 is not intended to be limited to the collection management system 204.

At operation 902, the playlist generation module 706 determines a number of occurrences of each audio content item in a set of audio content items. An occurrence of an audio content item indicates each instance in which a user recorded a portion of the audio content item using their client device 102, for use with the audio content identification system 210.

At operation 904, the playlist generation module 706 determines whether the number of occurrences of each audio content item meets or exceeds a threshold number of occurrences.

At operation 906, the playlist generation module 706 includes each audio content item associated with a number of occurrences that meets or exceeds the threshold number of occurrences to the playlist.

Figure 10:
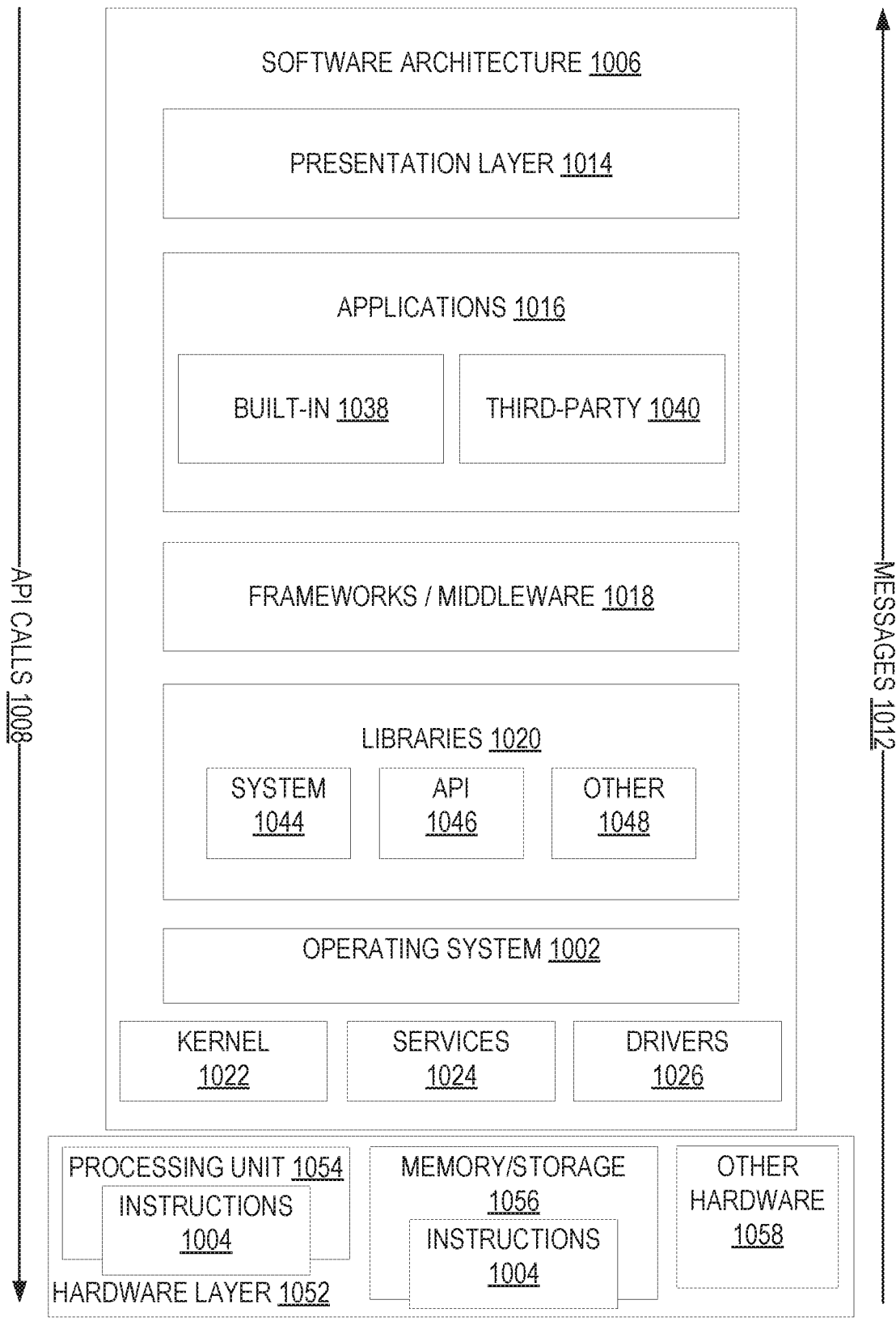
FIG. 10 is a block diagram illustrating a representative software architecture, which may be used in conjunction with various hardware architectures herein described.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as machine 1100 of FIG. 11 that includes, among other things, processors 1104, memory 1114, and I/O components 1118. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory and/or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016 and a presentation layer 1014. Operationally, the applications 1016 and/or other components within the layers may invoke Application Programming Interface (API) calls 1008 through the software stack and receive a response as in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024 and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers. Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024 and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024 and/or drivers 1026), libraries 1020, and frameworks/middleware 1018 to create user interfaces to interact with users of the system. Alternatively, or additionally, in some systems interactions with a user may occur through a presentation layer, such as presentation layer 1014. In these systems, the application/component "logic" can be separated from the aspects of the application/component that interact with a user.

Figure 11:
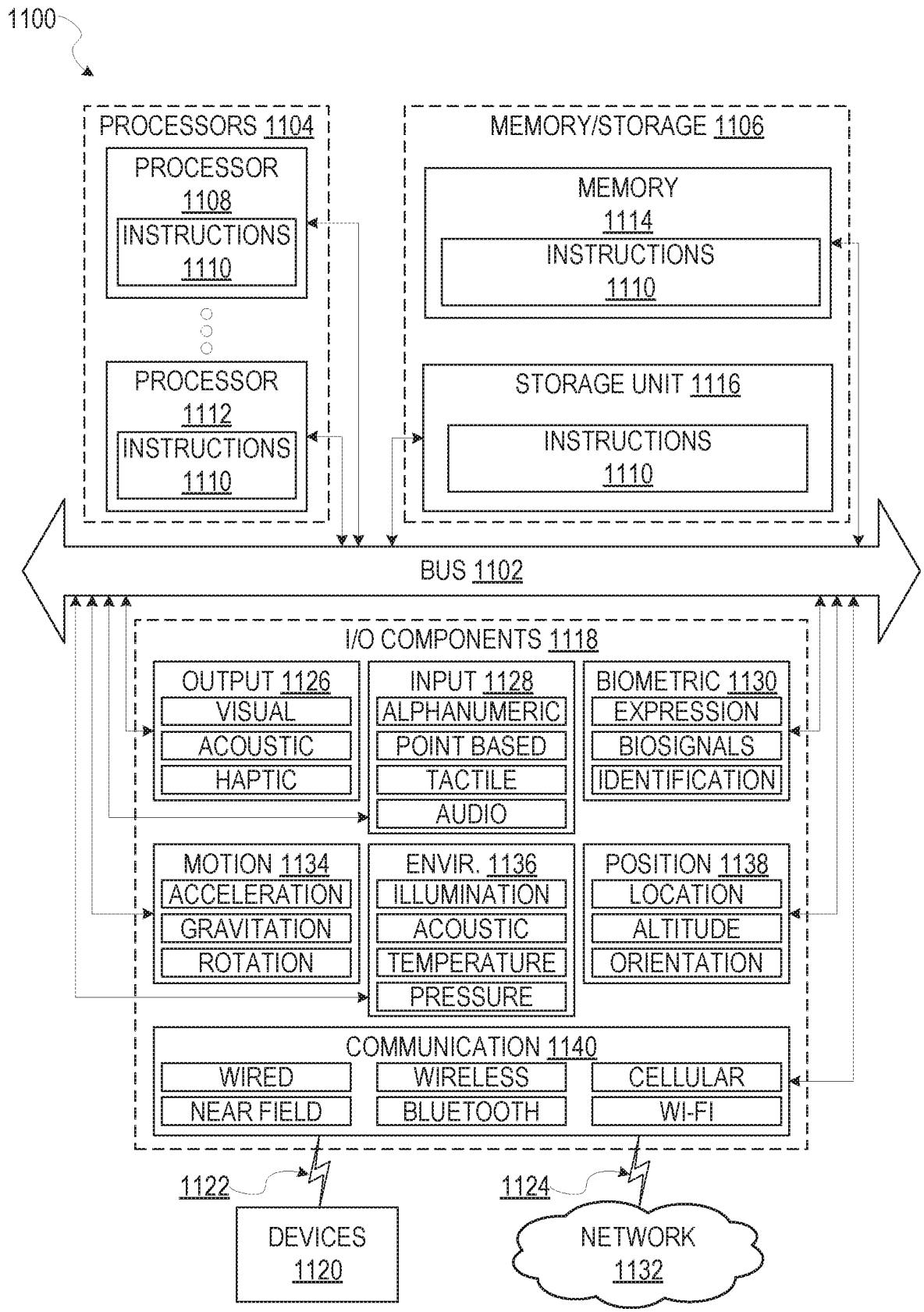
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A method comprising:
  receiving audio data packages from a plurality of client devices, each audio data package including: audio content captured by a respective client device from the plurality of client devices, and location data describing a location of the respective client device when the audio content was captured;

identifying, based on the location data included in the audio data packages, a subset of the audio data packages that include audio content captured within a predetermined geographic area;

generating a set of audio content items based on the subset of audio data packages;

for each audio content item in the set of audio content items, determining a number of occurrences of the respective audio content item, wherein the number of occurrences comprises a number of times the audio content is captured by the respective client device at the predetermined geographic area;

generating, based on the subset of the audio data packages and the number of occurrences, a playlist of audio content items for the predetermined geographic area; and providing the playlist of audio content items to at least a first client device.

2. The method of claim 1, wherein generating the set of audio content items comprises:

for each audio data package from the subset of audio data packages, identifying, based on the audio content included in the respective audio data package, an audio content item captured by the respective client device.

3. The method of claim 2, wherein generating the playlist of audio content items for the predetermined geographic area comprises selecting audio content items based on the number of occurrences of each respective audio content item, wherein the playlist of audio content items comprises the selected audio content items.

4. The method of claim 3, wherein selecting the set of audio content items based on the number of occurrences of each respective audio content item comprises:

for each audio content item in the set of audio content items, determining whether the number of occurrences of the respective audio content item meets or exceeds a threshold number of occurrences.

5. The method of claim 1, further comprising:

identifying, based on the location data included in the audio data packages, a second subset of the audio data packages that include audio content captured within a second predetermined geographic area;

generating, based on the second subset of the audio data packages, a second playlist of audio content items for the second predetermined geographic area; and providing the second playlist of audio content items to at least a second client device.

6. The method of claim 1, wherein identifying the subset of audio data packages further comprises:

identifying audio data packages that were received during a predetermined time period.

7. The method of claim 1, wherein the predetermined geographic area correlates to an organized event.

8. The method of claim 1, wherein generating the set of audio content items comprises:

for each audio data package from the subset of audio data packages, identifying, based on the audio content included in the respective audio data package, an audio content item captured by the respective client device.

9. The non-transitory computer-readable medium of claim 8, wherein generating the playlist of audio content items for the predetermined geographic area comprises selecting audio content items based on the number of occurrences of each respective audio content item, wherein the playlist of audio content items comprises the selected audio content items.

10. The non-transitory computer-readable medium of claim 9, wherein selecting the set of audio content items based on the number of occurrences of each respective audio content item comprises:

for each audio content item in the set of audio content items, determining whether the number of occurrences of the respective audio content item meets or exceeds a threshold number of occurrences.

11. The method of claim 1, wherein the audio content of each audio data package of the audio data packages is captured by a microphone of the respective client device.

12. A system comprising:

one or more computer processors; and one or more computer-readable mediums storing instructions that, when executed by the one or more computer processors, cause the system to perform operations comprising:

receiving audio data packages from a plurality of client devices, each audio data package including:

audio content captured by a respective client device from the plurality of client devices, and location data describing a location of the respective client device when the audio content was captured;

identifying, based on the location data included in the audio data packages, a subset of the audio data packages that include audio content captured within a predetermined geographic area;

generating a set of audio content items based on the subset of audio data packages;

for each audio content item in the set of audio content items, determining a number of occurrences of the respective audio content item, wherein the number of occurrences comprises a number of times the audio content is captured by the respective client device at the predetermined geographic area;

generating, based on the subset of the audio data packages and the number of occurrences, a playlist of audio content items for the predetermined geographic area; and providing the playlist of audio content items to at least a first client device.

13. The system of claim 12, the operations wherein generating the set of audio content items comprises: for each audio data package from the subset of audio data packages, identifying, based on the audio content included in the respective audio data package, an audio content item captured by the respective client device.

14. The system of claim 13, wherein generating the playlist of audio content items for the predetermined geographic area comprises selecting audio content items based on the number of occurrences of each respective audio content item, wherein the playlist of audio content items comprises the selected audio content items.

15. The system of claim 14, wherein selecting the set of audio content items based on the number of occurrences of each respective audio content item comprises:

for each audio content item in the set of audio content items, determining whether the number of occurrences of the respective audio content item meets or exceeds a threshold number of occurrences.

16. The system of claim 12, the operations further comprising:

identifying, based on the location data included in the audio data packages, a second subset of the audio data packages that include audio content captured within a second predetermined geographic area;

generating, based on the second subset of the audio data packages, a second playlist of audio content items for the second predetermined geographic area; and providing the second playlist of audio content items to at least a second client device.

17. The system of claim 12, wherein identifying the subset of audio data packages further comprises:

identifying audio data packages that were received during a predetermined time period.

18. The system of claim 12, wherein the predetermined geographic area correlates to an organized event.

19. A non-transitory computer-readable medium storing instructions that, when executed by one or more computer processors of a computing system, cause the computing system to perform operations comprising:

receiving audio data packages from a plurality of client devices, each audio data package including:

audio content captured by a respective client device from the plurality of client devices, and location data describing a location of the respective client device when the audio content was captured;

identifying, based on the location data included in the audio data packages, a subset of the audio data packages that include audio content captured within a predetermined geographic area;

generating a set of audio content items based on the subset of audio data packages;

for each audio content item in the set of audio content items, determining a number of occurrences of the respective audio content item, wherein the number of occurrences comprises a number of times the audio content is captured by the respective client device at the predetermined geographic area;

generating, based on the subset of the audio data packages and the number of occurrences, a playlist of audio content items for the predetermined geographic area; and providing the playlist of audio content items to at least a first client device.

20. The non-transitory computer-readable medium of claim 19, the operations further comprising:

identifying, based on the location data included in the audio data packages, a second subset of the audio data packages that include audio content captured within a second predetermined geographic area;

generating, based on the second subset of the audio data packages, a second playlist of audio content items for the second predetermined geographic area; and providing the second playlist of audio content items to at least a second client device.

\* \* \* \* \*